Figure 1:
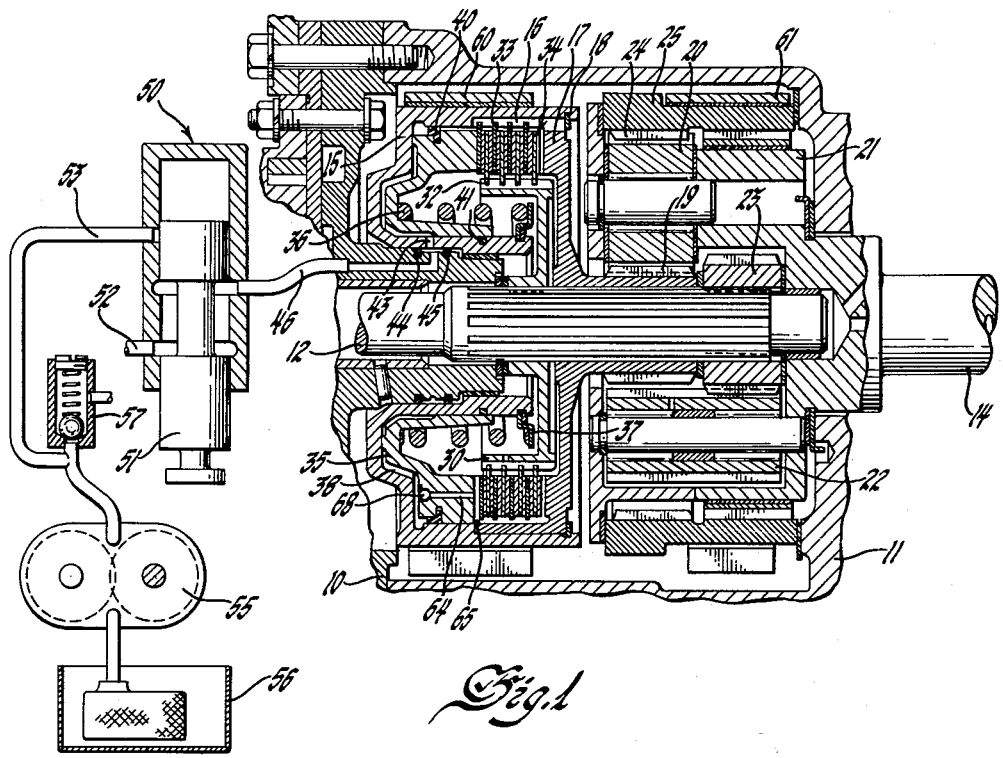

April 3, 1956  H. FISCHER  2,740,512
HYDRAULIC CLUTCH AND RELIEF VALVE THEREFOR
Filed Jan. 25, 1952

Inventor
Harold Fischer
By Willis, Helwig & Baillio
Attorneys

United States Patent Office 2,740,512
Patented Apr. 3, 1956

2,740,512

HYDRAULIC CLUTCH AND RELIEF VALVE THEREFOR

Harold Fischer, Flint, Mich., assignor to General Motors Corporation, Detroit, Mich., a corporation of Delaware Application January 25, 1952, Serial No. 268,299

9 Claims. (Cl. 192—85)

This invention relates to hydraulically operated clutches, and more particularly to an improved relief valve for use with a hydraulically operated clutch. It is particularly adapted to clutches for automobile transmissions but not limited to such use.

As frequently constructed, a hydraulically operated clutch has elements cooperating to form an annular operating or control chamber which is rotatable about an axis, and is adapted to contain liquid under pressure. A wall of the chamber is movable in response to variations in the pressure of the liquid in the chamber and controls clutch elements to couple an input and an output shaft together on an increase in the pressure of the liquid in the chamber. A control passage usually near the center of rotation of the control chamber, communicates with the chamber and is controlled by valve means so that the chamber may be connected to exhaust or to a source of liquid under pressure.

On rotation of the clutch elements forming the operating chamber, the liquid in the chamber develops pressure on the movable wall due to centrifugal force, and unless means other than the central control passage is provided to release liquid from the chamber, the centrifugal pressure developed by the liquid in the chamber as a result of rotation of the chamber may prevent release of the clutch, or may cause undesired engagement of the clutch.

An object of the invention is to provide simple and effective means for automatically releasing liquid from the chamber of a hydraulically operated clutch.

A further object of the invention is to provide an improved relief valve of the type described.

Another object of the invention is to provide a relief valve incorporating valve element which is urged to the open position by centrifugal force, and is urged to the seated position by liquid in the clutch chamber.

A further object of the invention is to provide an improved relief valve of the type described having a passage extending substantially parallel to the axis of rotation and surrounded by a conical seat which is engaged by a ball valve element.

Other objects of the invention and features of novelty will be apparent from the following description taken in connection with the accompanying drawings.

As one example of my invention I provide a rotatable drum in which there is mounted an annular piston so that there is formed between the drum and the piston an annular operating or control chamber adapted to contain liquid under pressure. The piston is urged in one direction by a release spring and is moved against this spring on an increase of the pressure of the liquid in the chamber. On movement of the piston against the spring by liquid in the control chamber, the piston exerts force to press together the plates of a multiple disc clutch which controls connection between an input and an output shaft. A relief passage extends through the wall of the chamber and is located at a point adjacent the periphery of the control chamber. This passage is surrounded by a tapered or conical seat disposed transverse to the axis, the large end of which seat faces the chamber. A ball valve element is located in the passage and engages the conical seat. The diameter and mass of the ball valve element, the slope of the seat, the radial distance of the relief passage from the axis of rotation, and the pressure of the source of liquid under pressure are arranged and proportioned so that the ball valve element is held in the seated position during rotation of the clutch elements when the ball valve element is subject to the pressure of the liquid in the chamber at the pressure which exists when this chamber is connected to the source, that is to the pressure resulting from both the pressure of the source and from centrifugal force, and so that centrifugal force moves the ball valve element out of engagement with its seat when this ball valve element is subject only to the pressure of the liquid in the chamber at the pressure present when this chamber is connected to exhaust, that is, to the pressure resulting only from centrifugal force.

Figure 2:
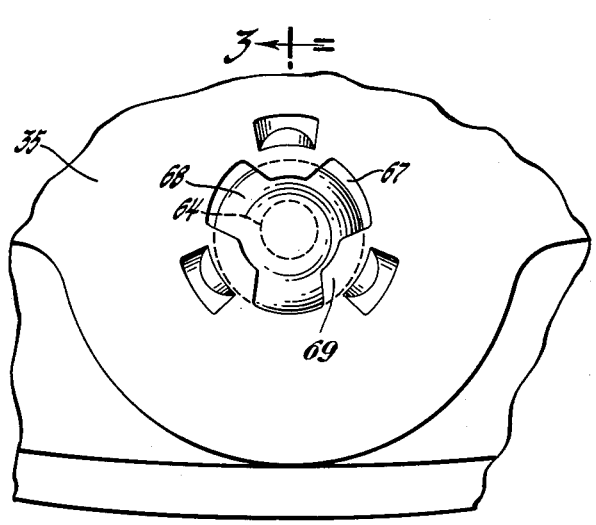
Figure 3:
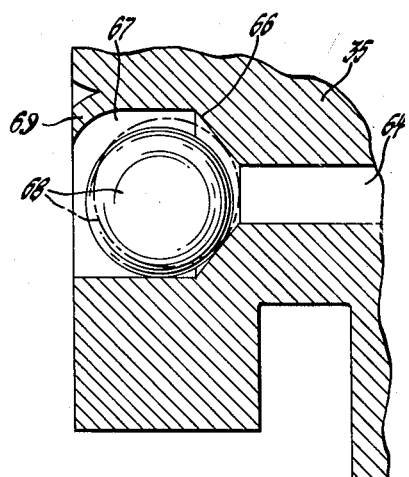

In the drawings:

Fig. 1 is a fragmentary sectional view of a transmission employing a hydraulically operated clutch equipped with the improved relief valve provided by this invention, Fig. 2 is an enlarged end view of the relief valve employed in the clutch shown in Fig. 1, and Fig. 3 is a sectional view taken along the line 3—3 on Fig. 2.

Referring to Fig. 1 of the drawings there is shown therein a portion of a transmission adapted for use in motor vehicles. The transmission illustrated for example is that shown in British Patent 653,230. However, it should be understood that the relief valve provided by this invention is not limited to use with this transmission, but is adapted for use with hydraulically operated clutches wherever employed.

The transmission shown in Fig. 1 has a housing comprising sections 10 and 11 which are detachably secured together in any suitable manner. The transmission also includes an input shaft 12 which is driven by the vehicle engine in any appropriate manner, and an output shaft 14 which is connected to the vehicle wheels.

The housing section 10 has formed integral therewith a central hub portion on which is rotatably supported the annular drum 15. The radially inner face of the outer wall of the drum 15 has splines 16 formed therein, while a member 17 has counterpart external splines which cooperate with the splines 16 on the drum 15. The member 17 is secured in position in the drum 15 by means of a lock ring 18.

The member 17 has formed integral therewith the sun gear 19 which meshes with the short planet gears 20 which are mounted on the carrier 21. The carrier 21 is formed integral with the output shaft 14 and also has mounted thereon the long planet gears 22. The long planet gears 22 mesh with the sun gear 23 which is splined to the input shaft 12 so as to rotate with the input shaft 12. The short planet gears 20 also mesh with the internal teeth 24 on the ring gear 25.

The splined portion of the input shaft 12 has mounted thereon the hub member 30 which is provided with internal splines which cooperate with the splines on the input shaft 12 to cause the hub member 30 to be driven by the shaft 12. The hub member 30 has in its external face splines which are adapted to receive the driving plates 32 of a multiple disc clutch 34. The driven plates 33 of this clutch are mounted in the splines 16 on the drum 15.

The member 17 and sun gear 19 are mounted on the splined portion of the input shaft 12, but the member 17 does not have internal splines. Hence, the member 17 is rotatably supported on the shaft 12 and is freely rotatable relative thereto.

A movable abutment or wall in the form of an annular piston 35 is mounted within the drum 15 and has on its exposed face an annular surface which engages one of the clutch plates 33 so that the piston may exert pressure on the clutch plates to press the clutch plates together. The piston 35 is yieldingly urged away from the clutch plates by means of a coil spring 36 which extends between the piston and a spring seat 37 secured on the central portion of the drum 15. The piston 35 and the drum 15 cooperate to form an annular control or operating chamber 38 which is adapted to contain liquid under pressure.

A packing ring 40 prevents leakage of liquid from the chamber 38 around the outer face of the piston 35, while a similar packing ring 41 prevents leakage of liquid through the joint between the inner face of the piston 35 and the drum 15.

Any suitable means may be provided for controlling the supply of liquid to and the release of liquid under pressure from the chamber 38. As shown, a passage 43 leads from the chamber 38 to the area between packing rings 44 and 45 secured in grooves on the housing section 10. A control passage 46 formed in the housing section 10 together with a pipe, of the same number, leads from the area between packing rings 44 and 45 to the control valve indicated generally by the reference number 50. The control valve 50 includes a valve element 51 which is movable in any suitable manner between two operating positions. In the position in which valve element 51 is shown in Fig. 1 of the drawings, the control passage 46 is connected to the exhaust passage 52 which leads to the sump. In the other position of the valve element 51, the connection from passage 46 to passage 52 is cut off and passage 46 is connected to supply passage 53 leading from the source of liquid under pressure.

Liquid under pressure for clutch operation may be supplied in any suitable manner. As shown, there is a pump 55 which may be driven by the vehicle engine and which draws oil from a sump 56 provided in the transmission housing. The pump 55 supplies oil to the passage 53 while the passage 53 has associated therewith a relief valve 57 which operates to release oil from the passage 53 when the pressure in this passage rises to a selected value, such as 80 p. s. i. The relief valve 57 comprises a ball valve element, which is held in the seated position by a coil spring, while oil which discharges through the relief valve is returned to the sump.

The transmission shown in Fig. 1 includes a band or brake 60 which is adapted to hold the drum 15 to provide low speed, and a band or brake 61 which is adapted to hold the ring gear 25 to provide reverse drive. The bands or brakes 60 and 61 may be operated by hydraulic servos, not shown, which may be controlled in any suitable manner.

The relief valve provided by this invention controls the release of liquid from the chamber 38. As is shown in Fig. 1 of the drawings the piston 35 has therein a passage 64 extending through the piston and located adjacent the radially outermost portion of the piston and of the chamber 38. The end of the passage 64 opening on the non-pressure side of the piston communicates with a radially extending groove 65 so that liquid may freely flow from the groove 64 to the area within the drum 15, from which the oil may escape to the transmission housing through the splined joint between members 15 and 17.

As is best shown in Fig. 3 of the drawings, the passage 64 is surrounded by a tapered or conical seat 66, the large end of which is adjacent the enlarged portion 67 of the passage and faces the clutch chamber 38. The enlarged end portion of the passage 64 forms a chamber 67 in which there is mounted a ball valve element 68. The ball valve element 68 is slightly smaller in diameter than the chamber 67, while the chamber 67 is of slightly greater depth than the diameter of the ball valve 68.

The ball valve 68 is loosely retained in the chamber 67 by staking over the material of the drum 35 after the ball valve element has been inserted in the chamber 67 as shown at 69.

Although only a single relief valve is shown in the drawings, it is contemplated that a plurality of relief valves may be provided and that they will be uniformly spaced apart circumferentially of the piston 35.

When the valve element 51 is in the position shown in Fig. 1 of the drawings, no oil is supplied to operate the clutch 34, so that the multiple disc clutch 34 is released, and if the brakes 60 and 61 are also released, the transmission is in neutral. If the vehicle engine is operated the input shaft 12 will rotate and will turn the clutch hub 30 and the sun gear 23. As the multiple disc clutch 34 is released, rotation of the clutch hub 30 is not transmitted through the clutch discs 32 and 33 to the member 17 so the sun gear 19 is not driven through the multiple disc clutch.

At this time the sun gear 23 is rotated by the input shaft 12 so the sun gear 23 drives the long planet gears 22 which in turn rotate the short planet gears 20. At this time it is assumed that the reverse brake 61 is released so the planet gears 20 are free to rotate the ring gear 25, and it is also assumed that the low speed brake 60 is released so that the short planet gears 20 are free to rotate the sun gear 19 which has rigidly connected thereto the member 17 and the drum 15. As the short planet gears 20 are free to rotate both the ring gear 25 and the sun gear 19, the short planet gears 20 do not exert driving force on the carrier 21 and on the output shaft 14. As hereinafter explained, the relief valve provided by this invention prevents engagement of the multiple disc clutch 34 by pressure developed on the liquid in chamber 38 by centrifugal force during rotation of the drum 15 irrespective of the rate of rotation of the drum 15. Hence, the transmission is certain to remain in neutral as long as the operator desires.

The piston 35 is mounted within the drum 15 and rotates at the same speed as the drum 15 because of frictional contact between the piston and the drum, and between the piston and the spring 36. The proportions of the sun gears 23 and 19 are such that when the transmission is in neutral or reverse the drum 15 rotates at a speed somewhat higher than the speed at which the input shaft 12 is rotated.

Upon the rotation of the piston 35 the ball valve element or elements 68 are forced radially outwardly by centrifugal force with the result that the ball valves 68 roll down the conical seats to open passages 64. As hereinafter explained, when valve 50 connects chamber 38 to exhaust and the drum 15 is rotated, the ball valve elements 68 are moved out of engagement with their seats 66 by centrifugal force. During rotation of the drum 15 the oil in the radially inner portions of the chamber 38 is forced outwardly and passes out through the passage 64. The oil in the portion of the chamber 38 radially outwardly of the passage 64 is forced outwardly by centrifugal force and cannot escape through the passage 64. This oil has pressure developed thereon by centrifugal force and this oil under pressure exerts force on the piston 35 and tends to move the piston against the spring 36. However, this force is exerted on only a relatively small portion of the total area of the face of the piston 35 so that the force exerted is insufficient to move the piston 35 against the spring 36, and therefore, is ineffective to cause engagement of the clutch plates 32 and 33.

When it is desired to engage the multiple disc clutch 34 the valve element 51 is moved to the position to cut off the exhaust passage 52 and to connect the supply passage 53 to the control passage 46. As a result oil from the pump 55 flows to passage 46 and thence through the passage 43 to the chamber 38. In the preferred construction the flow capacity of the passage 46 and other passages leading from the source of supply to the chamber 38 is substantially greater than the combined flow capacity of the relief passages 64, assuming that there are a plurality of relief passages. Accordingly, when the valve 51 is operated to supply oil under pressure to the chamber 38 some oil will initially flow from the chamber 38 past the relief valve element or elements 68 but oil cannot escape through the relief valve or valves as rapidly as oil is supplied to the chamber so there will be a rapid increase in the pressure of the liquid in the chamber 38. On this increase in the pressure of the liquid in the chamber 38 force is exerted on the relief valve element or elements 68 to move them to the seated position and hold them in that position to prevent further escape of liquid from the chamber 38. At this time the liquid in the portion of the chamber 38 adjacent the relief ball valves has pressure exerted thereon not only because of the pressure of the source, but also because of centrifugal force as result of rotation of the drum 15.

The various portions of the relief valve and other parts of the apparatus, such as the weight of the ball valve elements, the radial distance of the ball valve elements from the axis of rotation, the angle of the seats 66, and the pressure of the source, are arranged and proportioned so that centrifugal force causes the ball valve elements 68 to move away from their seats against the opposing force of oil under pressure when the pressure of this oil is of the value produced solely by centrifugal force acting on the oil in the chamber 38, but so that centrifugal force is ineffective to move the ball valve elements 68 away from their seats against the opposing force of oil under pressure in the chamber 38 when this oil is at the pressure determined by centrifugal force supplemented by the pressure of the source.

Accordingly, when valve 51 is operated to connect the source to the chamber 38, the relief valves are automatically operated to close the associated relief passages with the result that pressure is developed on the liquid in the chamber 38 and is effective to move the piston 35 against the spring 36 to press together the clutch plates 32 and 33 and thereby connect the clutch hub member 30 to the member 17 with the result that the sun gear 19 is rigidly secured to the input shaft 12. As both sun gears 19 and 23 are rigidly secured to the input shaft 12 the planetary gearing is locked in direct drive and the output shaft 14 is driven at the speed of the input shaft 12. At this time the drum 15 rotates at the speed of the input shaft 12.

On an increase in the speed of rotation of the input shaft 12, and therefore of the drum 15 and the piston 35, there is an increase in the centrifugal force exerted on the ball valve elements 68 and tending to move these valve elements away from their seats. However, on the increase in the speed of rotation of the drum 15 and the piston 35, there is a corresponding increase in the pressure developed by centrifugal force on the liquid in the chamber 38 with the result that there is an increase in the force tending to hold the ball valve elements 68 in engagement with their seats. Accordingly, regardless of variations in the rate of rotation of the input shaft 12, the ball valve elements 68 are certain to remain seated as long as the chamber 38 is connected to the source.

When it is desired to release the multiple disc clutch 34 the valve element 51 is moved to the position in which it is shown in Fig. 1 of the drawings in which the passage 53 leading from the pump is blocked, and in which the control passage 46 is connected to exhaust passage 52. This movement of the valve element 51 relieves the liquid in chamber 38 from the pressure exerted by the source so that the liquid in the chamber 38 is now subject only to pressure resulting from centrifugal force. Hence, irrespective of the rate of rotation of the input shaft 12 at the time the valve 50 is operated to connect chamber 38 to exhaust, there is a substantial reduction in the force exerted by the liquid in chamber 38 and tending to hold the relief valve elements 68 in the seated position.

Accordingly, centrifugal force acting upon the ball valve elements 68 is now effective to move these valve elements away from their seats and permit liquid in the chamber 38 to escape through the passages 64 so that all of the liquid in the portion of chamber 38 radially inwardly of the relief passages 64 escapes from the chamber. This reduces the proportion of the area of piston 35 which is subject to the pressure of liquid in the chamber 38 to such an extent that the liquid remaining in chamber 38 is ineffective to overcome the spring 36, and the spring 36 moves the piston to relieve the pressure on the clutch plates 32 and 33.

The relief valve provided by this invention is arranged so that both engagement and release of the clutch is positive irrespective of variations in the rate of rotation of drum 15. At low rates of rotation of the drum 15 centrifugal force causes only small pressure to be developed on the liquid in chamber 38. However, the force exerted by this liquid on the valve elements 68 will be sufficient, when augmented by pressure from the source, to cause seating of the relief valve elements 68 because, at low rates of rotation, centrifugal force exerts relatively small force on these valve elements to move them away from their seats. Similarly, at low rates of rotation, centrifugal force is effective to move the ball valve elements away from their seats against the opposing force of the liquid when the source is disconnected from the chamber 38 because centrifugal force develops only limited pressure on this liquid.

In like manner, at high rates of rotation of the drum 15 there is an increase in the effect of centrifugal force on both the pressure of the liquid in the chamber 38 and on the ball valve elements 68 so that the ball valve elements are seated or unseated according as the pressure in chamber 38 is or is not augmented by pressure from the source.

Although I have illustrated and described one form of relief valve embodying my invention, it is understood that various changes and modifications may be made therein within the scope of the appended claims without departing from the spirit and scope of my invention.

I claim:

1. In a centrifugally operated relief valve for controlling release of liquid from a hydraulically operated clutch including a cylinder mounted for rotation about an axis, a movable abutment, said cylinder and said movable abutment cooperating to form a chamber adapted to contain liquid under pressure, an input shaft, an output shaft, friction clutch elements controlled by said movable abutment and effective on an increase in the pressure of the liquid in said chamber to establish driving connection between said input and output shafts, a source of liquid under pressure, and a control valve operative at times to connect said chamber to said source and at other times to connect said chamber to exhaust, said relief valve controlling the release of liquid from said chamber, and comprising a passage opening through a wall of said chamber, said passage being spaced from said axis at least at a substantial portion of the radial distance from said axis to the periphery of said chamber, said passage being surrounded by a tapered seat disposed transverse to the axis the larger end of said seat being adjacent said chamber, and a valve element located in said passage and engageable with said seat.

2. In a centrifugally operated relief valve for controlling release of liquid from a hydraulically operated clutch including a cylinder mounted for rotation about an axis, a movable abutment, said cylinder and said movable abutment cooperating to form a chamber adapted to contain liquid under pressure, an input shaft, an output shaft, friction clutch elements controlled by said movable abutment and effective on an increase in the pressure of the liquid in said chamber to establish driving connection between said input and output shafts, a source of liquid under pressure, and a control valve operative to at times connect said chamber to said source and to at other times connect said chamber to exhaust, said relief valve controlling the release of liquid from said chamber and comprising a passage opening through a wall of said chamber, said passage being spaced from said axis at least a substantial portion of the radial distance from said axis to the periphery of said chamber, said passage having at the end thereof adjacent said chamber a portion of large diameter, and having at the end thereof remote from said chamber a portion of small diameter, said passage portions being separated by a tapered seat disposed transverse to the axis the larger end of the seat being adjacent said chamber, and a ball valve element loosely mounted in said passage portion of large diameter, said ball valve element being of smaller diameter than said passage portion of large diameter and being of larger diameter than said passage portion of small diameter.

3. In a centrifugally operated relief valve for controlling release of liquid from a hydraulically operated clutch having an operating chamber rotatable about an axis and having friction clutch elements controlled by a member subect to the pressure of the liquid in said operating chamber, said relief valve comprising a passage opening through a wall of said operating chamber, said passage being spaced from said axis at least a substantial part of the distance from said axis to the periphery of said chamber, a tapered seat surrounding said passage and disposed transverse to the axis, the larger end of said seat being adjacent said chamber, and a ball valve element located in said passage so as to be urged toward said seat by liquid under pressure in said chamber and to be urged out of engagement with said seat by centrifugal force.

4. In centrifugally operated relief valve means for controlling release of liquid from a hydraulically operated clutch having an operating chamber rotatable about an axis and having friction clutch elements controlled by a member subject to the pressure of the liquid in said operating chamber, said clutch including a control passage governed by a valve device by means of which said operating chamber may at times be connected to a source of liquid under pressure and may at other times be connected to exhaust, said relief valve means comprising a relief passage opening through a wall of said operating chamber, said passage being spaced from said axis at least a substantial part of the distance from said axis to the periphery of said chamber, a tapered seat surrounding said passage and disposed transverse to the axis, the larger end of said seat being adjacent said chamber, and a ball valve element located in said passage between said seat and said chamber, the flow capacity of said relief valve means being smaller than the flow capacity of said control passage.

5. In a hydraulically operated power transmitting mechanism the combination of an expansible, rotatable pressure chamber having a movable wall, means for rotating the chamber, means for supplying liquid to the chamber and maintaining pressure therein to move the wall, a controllable passage for venting the chamber to relieve said pressure, a second passage for releasing liquid from said pressure chamber to thereby relieve pressure due to centrifugal force on liquid in the pressure chamber when said first passage vents the chamber and said chamber is rotated, a valve seat adjacent said second passage including a surface of revolution disposed transverse to the axis of rotation of the chamber, means for retaining a valve element loosely positioned adjacent said seat, said valve element being adapted to be seated against said surface of revolution by liquid flowing through said second venting passage, and said valve element being urged away from said surface of revolution by centrifugal force when the chamber is rotating.

6. In a hydraulically operated power transmitting mechanism the combination of an expansible rotatable pressure chamber having a movable wall, means for rotating the chamber, means for supplying liquid to the chamber and maintaining static pressure therein to move the wall, a controllable passage for venting the chamber to relieve said static pressure, a second passage for releasing liquid from said pressure chamber to thereby relieve pressure due to centifugal force on liquid in the chamber when said first passage vents the chamber and said chamber is rotated, a valve seat surrounding said second passage, means for loosely supporting a valve element adjacent the seat, the valve element being urged away from the seat by centrifugal force acting on the valve element when the chamber is rotating and being adapted to be held against the seat by liquid in said chamber, the mass of the valve element and its radial distance from the center of rotation of the chamber being so related that centrifugal force on the valve element always exceeds the force exerted on the valve element by liquid at the pressure due to centrifugal force.

7. In a hydraulically operated power transmitting mechanism the combination of walls defining an expansible pressure chamber; one of said walls being movable with respect to another wall; means for rotating the chamber about an axis; means for supplying liquid under pressure to the chamber for moving the movable wall; means for interrupting the supply of liquid and relieving the pressure of the supplying means; a passage spaced from the axis for conducting liquid from the chamber, the passage including a portion of relatively small cross section, a portion of relatively large cross section between the chamber and the portion of small cross section, and a valve seat connecting said portions; a ball valve in the portion of large cross section; and means for retaining the ball in the passage.

8. In a hydraulically operated power transmitting mechanism the combination of walls defining an expansible pressure chamber, one of said walls being movable with respect to another wall; means for rotating the chamber about an axis; means for supplying liquid under pressure to the chamber for moving the movable wall; means interrupting the supply of liquid and relieving the pressure of the supplying means; a passage spaced from the axis for conducting liquid from the chamber, the passage being formed in a wall of the chamber and including a portion of relatively small cross section, a portion of relatively large cross section between the chamber and the portion of small cross section, and a valve seat connecting said portions; a ball valve in the portion of large cross section; the material of the wall adjacent the passage being deformed to provide means for retaining the ball in the passage.

9. In a hydraulically operated power transmission mechanism the combination of walls defining an expansible pressure chamber, one of the walls being movable with respect to another wall, means for rotating the chamber about an axis, a supply conduit connected to the chamber, means for supplying liquid under pressure to the supply conduit for moving the movable wall, means for interrupting the supply of liquid and for relieving the pressure of the supply means, an opening in the wall of the chamber spaced from the axis for conducting liquid from the chamber, a valve element, and means for retaining the valve element adjacent the opening and between the opening and the chamber, said valve element being positioned to be urged away from the opening by centrifugal force when the chamber is rotated, and the flow capacity of the opening being less than the flow capacity of the supply conduit whereby liquid supplied to the chamber by said supply means will move the valve to close the opening.

References Cited in the file of this patent

UNITED STATES PATENTS

| | | |
|---|---|---|
| 1,440,224 | Kasley | Dec. 26, 1922 |
| 2,163,202 | Kegresse | June 20, 1939 |
| 2,163,203 | Kegresse | June 20, 1939 |
| 2,297,480 | Kratsmann | Sept. 29, 1942 |
| 2,440,589 | Kegresse | Apr. 27, 1948 |
| 2,511,518 | Stephens | June 13, 1950 |
| 2,642,844 | Flinn | June 23, 1953 |